Figure 2:
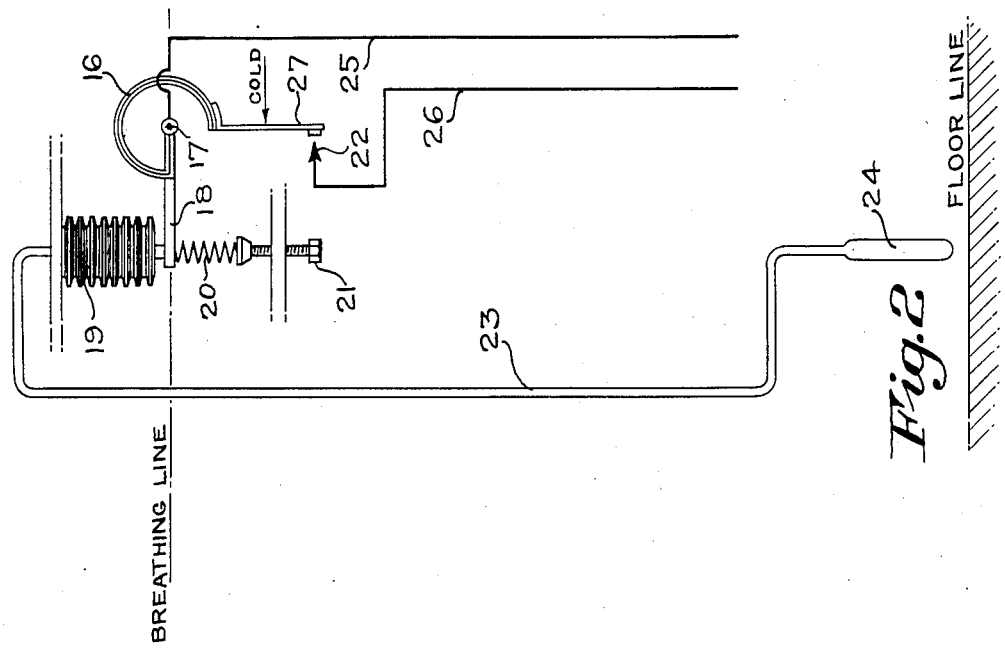

Nov. 28, 1939.  A. C. GRANT  2,181,427

TEMPERATURE CONTROL SYSTEM

Filed Jan. 2, 1936

Inventor

Arthur C. Grant

By George H. Fisher

Attorney

Patented Nov. 28, 1939

2,181,427

UNITED STATES PATENT OFFICE 2,181,427

TEMPERATURE CONTROL SYSTEM

Arthur C. Grant, St. Paul, Minn., assignor to Minneapolis-Honeywell Regulator Company, Minneapolis, Minn., a corporation of Delaware Application January 2, 1936, Serial No. 57,085

1 Claim. (Cl. 236—91)

My invention relates to an improvement in a temperature control system, and particularly to means for varying the operation of said system in accordance with the difference in temperature between two levels.

In the heating of buildings, considerable difficulty is experienced in that the temperature at lower levels tends to be less than that at higher levels. This tendency increases as the temperature outside the building falls farther below that maintained inside the building. This differential in temperature between different levels depends to some extent upon the building characteristics, but for any particular type of building it is possible to determine a definite relationship between this differential and the difference between outside and inside temperatures.

The common practice is to locate a thermostat or other heat-responsive device at a point corresponding to the normal breathing level. In such an installation, the thermostat is usually adjusted so that an optimum temperature, usually around 70°, is maintained at the level at which the thermostat is located. As the temperature outside falls below this temperature, the temperature adjacent to the floor also decreases. If this temperature drop is sufficiently great, the occupant of the room, especially if he be seated, will experience considerable discomfort. If the thermostat is set so as to maintain a higher temperature, the room will be comfortable until the temperature outside again changes with the resultant change in the differential between breathing line and floor line temperatures. The temperature maintained will, however, be too high in mild weather and the result will be that the occupant becomes accustomed to an excessively high temperature and there will be an unnecessary wastage of fuel.

An attempt has been made to overcome this difficulty by locating a thermostat at an intermediate level. Such an arrangement is unsatisfactory since the differential in temperature between said levels varies. Thus, if the thermostat is adjusted so as to maintain a temperature lower than the optimum temperature at said intermediate level, the temperature at the breathing line level will be uncomfortably low when there is only a slight differential in temperature between the two levels. If, on the other hand, the intermediately located thermostat is adjusted so as to maintain an optimum temperature at said intermediate level, and the temperature outside becomes so low that the temperature differential becomes large, either the temperature adjacent the normal breathing level is too high or that adjacent the floor is too low, depending upon the height at which the thermostat is located.

An object of the present invention is to provide means for automatically adjusting a thermostat located at the normal level in accordance with the variation in the differential between breathing line and floor line temperatures.

A further object of the present invention is to provide a temperature control system in which the point at which the temperature is controlled is shifted in accordance with the degree with which the breathing line temperature differs from the temperature at the floor line level.

A further object of this invention is to provide temperature control means located at one level and responsive to the temperature at said level, which means is automatically compensated by temperature responsive means located at a second level.

Figure 1:
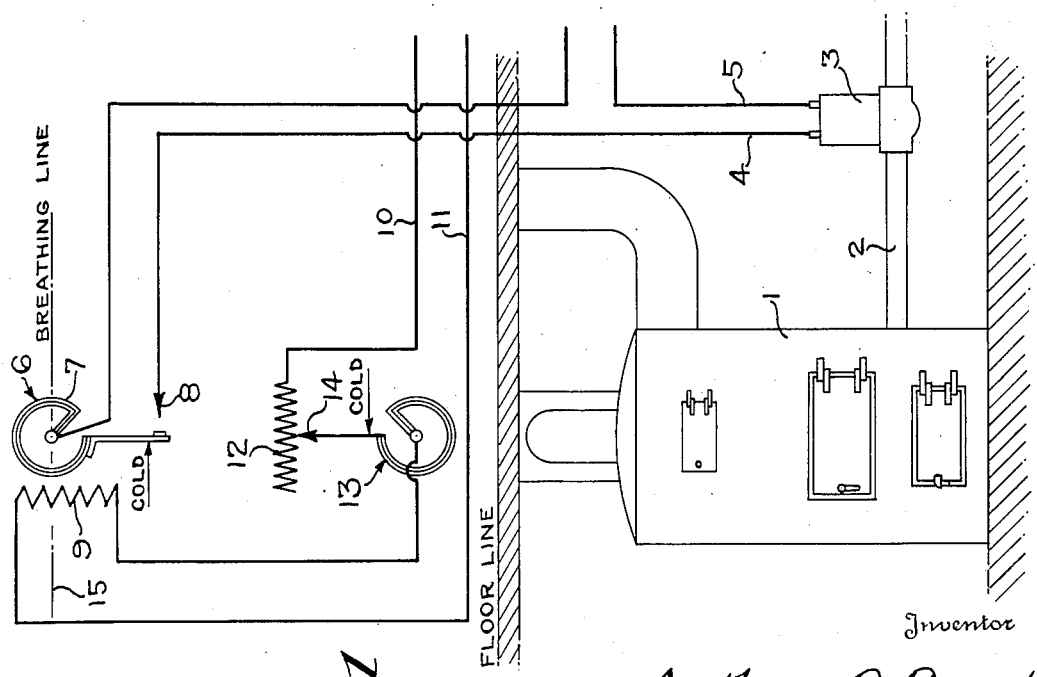

Further objects of the invention will be apparent from the accompanying description and drawing, of which: Figure 1 is a diagrammatical view of my system shown as associated with a conventional heating plant, and Figure 2 is a semi-diagrammatical view of an alternative form of my temperature control system on a somewhat larger scale.

Referring to Figure 1 of the drawing, my temperature control system is shown as associated with a conventional heating plant 1 supplied with a suitable fuel, which for purposes of illustration may be gas, through a pipe 2 controlled by an electrically operated valve 3. Said valve is connected through conductors 4 and 5 with a suitable source of power, not shown, in series with a temperature responsive device 6 which controls the operation of said valve.

Said temperature responsive device 6, which is shown in the form of a conventional thermostat, is located at the breathing line 15. It comprises a bimetallic element 7, to which is attached a contact arm adapted to engage with a contact 8. The bimetallic element is so constituted as to cause said contact arm to move into engagement with said contact upon a fall in temperature in the space in which said thermostat is located.

Associated with said thermostat is an electrical heating element 9 supplied through conductors 10 and 11, with electrical current for heating the same. The flow of electrical current to said heating element 9 is controlled by a resistance 12 having a contact 14 in sliding engagement therewith. The movement of said contact over said resistance 12 is controlled by a second heat responsive element 13 located adjacent to the floor line level. This heat responsive element 13 comprises a bimetallic element which is so constituted as to cause said contact 14 to move to the left upon the temperature adjacent to the floor line falling.

The apparatus is adjusted so that when the temperature is uniform throughout the room, thermostat 6 will control the action of the valve in the fuel supply means so as to cause an optimum temperature to be maintained at the breathing line level. When the apparatus is so adjusted, contact 14 will be as far to the right upon resistance 12 as it will be in normal operation. Under these conditions heating element 9 will be supplied with the maximum amount of heat with which it is supplied during operation.

As the temperature falls outside with corresponding fall in temperature adjacent to the floor line, thermo-responsive element 13 will cause contact 14 to be moved to the left with the result that more resistance is introduced into the circuit so that less current is supplied to heating element 9. This will result in the contacts of thermostat 6 remaining in engagement at a higher temperature than before, with the result that a higher temperature is maintained at the breathing line level. The result of this increase in temperature at the breathing line level is that the optimum temperature now exists at some intermediate point between said breathing line level and floor line level. It will thus be seen that this increase in the temperature maintained at the upper level produces an effect similar to a physical lowering of the position of the thermostat 6. If the temperature outside should fall still further with the resultant further decrease in the temperature adjacent to the floor line level, heater 9 will be supplied with still less current and the temperature at which the contacts of the thermostat separate is still further raised. Thus, a still higher temperature will be maintained at the breathing line level and the effective point of control will be shifted still lower. It will be readily seen that as the temperature adjacent to the floor line again rises, the temperature maintained adjacent the breathing line level will be correspondingly decreased.

While I have shown a bimetallic element for affecting the movement of contact 14 along resistance 12, it will be obvious that any other suitable temperature responsive means could be employed. For example, an expansible bellows element filled with a temperature-sensitive fluid might well be employed for this purpose.

In Figure 2 I have shown a modified form of my temperature control mechanism. In this form the heat responsive device at the breathing line level is shown in the form of a conventional thermostat consisting of a bimetallic element 16, pivotally mounted at 17, and rigidly secured to an arm 18. Said arm 18 is engaged on one side by an expansible bellows element 19 and on the other side by a spring 20. The tension of said spring 20 is varied by means of an adjusting screw 21. The thermostat has a contact arm 27 engaging with a contact 22 to close a circuit through conductors 25 and 26 to a fuel controlled valve in the same manner as in the previously described species.

The spacing of contact arm 27 from contact 22 is adjusted by varying the tension on spring 20 by means of the screw 21. Connected to said expansible bellows 19 by capillary tubing 23 is a bulb 24. Said bulb 24 is located adjacent the floor and contains a volatile fluid, the vapor tension of which varies in accordance with the temperature adjacent said floor. As this vapor tension varies, the bellows element 19 is expanded or contracted, thus shifting the thermostat at its pivot 17, to move arm 27 farther from, or closer to, its contact 22.

The system is initially adjusted as in the preceding case with the temperature adjacent the floor which is substantially the same as that adjacent the breathing line level. Under these conditions, thermostat 16 is adjusted so that it will maintain an optimum temperature at the level at which it is located. As the floor line temperature falls, the vapor tension in bulb 24 will decrease with the result that thermostat 16 is shifted about pivot point 17 and contact arm 27 is accordingly brought into closer engagement with contact 22. The result of this change in adjustment of the thermostat is that the contact arm will remain in engagement with contact 22 at a higher temperature than before, with the result that a higher temperature is maintained at the breathing line level. As in the preceding case, the effect of this increase in temperature adjacent to the breathing line level is a lowering of the point at which the temperature is controlled.

It will be readily seen that I have provided a means whereby it is possible to locate a thermostat at a level at which it is most desirable to normally maintain an optimum temperature, and still avoid the presence of an uncomfortably low temperature adjacent the floor. Although my temperature control system maintains a temperature which is comfortable adjacent the floor line, the temperature maintained is one which is also comfortable at the breathing line level. Moreover, as the differential in temperature between said levels approaches a zero value, the thermostat at the breathing line level approaches normal operation.

While I have described two detailed embodiments of my invention, it will be understood that these are merely for the purpose of illustration, and that my invention is limited only by the scope of the appended claim.

I claim as my invention:

In a system for controlling the temperature of a room, said temperature tending to be lower at lower levels in the room, a fluid fuel fired furnace for heating a fluid medium, means for circulating said fluid medium through said room, a thermostat responsive to the temperature of the room air at the breathing line level, means controlled by said thermostat for regulating the flow of fluid fuel to said furnace, a continuously effective auxiliary heater having a variable resistance in circuit therewith located adjacent said thermostat to vary the control point thereof, and a second thermostat responsive to the temperature of the room air adjacent the floor and operative to vary said resistance to decrease the heating effect of said auxiliary heater as the temperature of the air adjacent the floor decreases.

ARTHUR C. GRANT.